United States Patent
Braica

(10) Patent No.: US 7,164,802 B2
(45) Date of Patent: Jan. 16, 2007

(54) METHOD FOR IMAGE COMPRESSION BY MODIFIED HUFFMAN CODING

(75) Inventor: Philip Braica, Bedford, NH (US)

(73) Assignee: Zoran Corporation, Sunnyvale, CA (US)

( * ) Notice: Subject to any disclaimer, the term of this patent is extended or adjusted under 35 U.S.C. 154(b) by 644 days.

(21) Appl. No.: 10/295,335

(22) Filed: Nov. 14, 2002

(65) Prior Publication Data

US 2004/0096115 A1 May 20, 2004

(51) Int. Cl.
G06K 9/36 (2006.01)
G06K 9/46 (2006.01)
H03M 7/00 (2006.01)
H03M 7/40 (2006.01)
H04N 1/32 (2006.01)
H04N 1/41 (2006.01)
H04N 1/413 (2006.01)

(52) U.S. Cl. ............... 382/244; 382/245; 382/246; 341/59; 341/65; 358/426.16

(58) Field of Classification Search ........... 382/166, 382/244–246; 341/59, 65; 358/426.13, 358/426.16
See application file for complete search history.

(56) References Cited

U.S. PATENT DOCUMENTS 4,376,588 A * 3/1983 Moeller ............... 400/322
5,455,578 A * 10/1995 Bhandari .............. 341/51

OTHER PUBLICATIONS

Bhaskara et al. "Image and Video Compression Standards—Algorithms and Architectures", 2nd. ed., 1997, p. 47.*

* cited by examiner

*Primary Examiner*—Jingge Wu
*Assistant Examiner*—Yubin Hung
(74) *Attorney, Agent, or Firm*—Lahive & Cockfield LLP

(57) ABSTRACT

The present invention provides a system that compresses and decompresses an image. The system includes a first codec a first stage codec for identifying runs of pixels of a defined value in a data stream of the image data beginning from the left and right margins of a line, such that information regarding the runs is assigned as a header and appended to the data stream. The compression device includes a second stage codec for scanning over remaining data in the data stream and compressing all but the header by utilizing a Huffman encoding scheme to reduce amount of data stored in the data stream, wherein the Huffman encoding scheme interleaves Huffman code values with unencrypted data while maintaining long word boundaries for the unencrypted data. The second codec also performs the operation of decompressing a compressed image.

29 Claims, 5 Drawing Sheets

METHOD FOR IMAGE COMPRESSION BY MODIFIED HUFFMAN CODING

FIELD OF THE INVENTION

The present invention relates to method for image compression and more specifically to a non-computationally intensive method of compressing image data.

BACKGROUND OF THE INVENTION

The extent of compression realized by application of conventional image compression techniques varies greatly depending on the image. Typical compression values for pages of text are between 6% and 10% of the original size the image occupies when stored in memory in an uncompressed format. Worst case photo images typically compress between 33% and 50% their original size. Other compression methods such as arithmetic encoding tend to compress text images to 4% to 8% of their original size, and worst case photo images do no better than 28% of their original size. Compression schemes, such as arithmetic coding, can take a very long time to compress, and also they do not compress individual lines very efficiently, or produce output that is segmented into lines. Thus, there is a need in the art for a method that allows efficient compression of image data at a small cost in execution time.

SUMMARY OF THE INVENTION

The present invention addresses the above-described limitations of conventional image compression methods. The present invention provides a non-computationally intensive approach of compressing image data. One embodiment of the present invention utilizes two different Huffman encoding schemes, and interlaces easily compressed data features that were Huffman encoded with uncompressible data segments in a data structure aligned format.

According to one aspect of the present invention, a compression device for compressing image data is provided. The compression device includes a first stage codec for identifying runs of pixels of a defined value in a data stream of the image data beginning from the left and right margins of a line, such that information regarding the runs is assigned as a header and appended to the data stream. Also, the compression device includes a second stage codec for scanning over remaining data in the data stream and compressing all but the header by utilizing a Huffman encoding scheme to reduce amount of data stored in the data stream, wherein the Huffman encoding scheme interleaves Huffman code values with unecoded data while maintaining long word boundaries for the unecoded data.

According to another aspect of the present invention, in a compression device, a method of compressing image data is provided. The method comprises the step of identifying runs of pixels of a defined value in a data stream beginning from the left and right margin of a line such that information regarding the runs is placed in a header and appended to the data stream. The method also includes the step of scanning over remaining data in the data stream and comprises all but the header by utilizing a Huffman encoding scheme to reduce the amount of data stored in the data stream, wherein the Huffman encoding scheme interleaves Huffman code values with unencoded data while maintaining long word boundaries for the unencoded data.

According to another aspect of the present invention, in compression device, a method of compressing image data is provided. The method comprises the steps of identifying runs of pixels of a defined value in a data stream beginning from the left and right margin of a line, and generating a header by assigning information collected regarding the runs of pixels to the header and appending the header as a first element in the data stream. The method also comprises the steps of allocating output words in the data stream after the header to be code words, and creating compressed components by encoding compressible code words with a defined set of Huffman codes, wherein the compressed components are copied to an output buffer. Also, when a code word is an uncompressible symbol, a Huffman code is added and then a data word is allocated for the uncompressible symbol, wherein the uncompressible symbol is copied to the output buffer.

According to another aspect of the present invention, a method of decompressing a compressed image is provided. The method comprises the step of receiving a compressed data stream associated with the compressed image, wherein the compressed data stream includes encoded compressed components, uncompressed components, and a header. The method also includes the steps of decoding the header stored in the compressed data stream, and assigning left and right margins of the compressed image by way of information contained in the header. The method also comprises the steps of removing the uncompressed components in the compressed data stream to an output buffer; and creating decoded components by using a defined set of Huffman codes used to decode the compressed components and deliver each of the decoded components to the output buffer. The method further includes the step of combining all of the uncompressed components and the decoded components in the output buffer to reproduce an actual image of the compressed image.

BRIEF DESCRIPTION OF THE DRAWINGS

The aforementioned features and advantages, and other features and aspects of the present invention, will become understood with regard to the following description and accompanying drawings; wherein.

DETAILED DESCRIPTION

The illustrative embodiment of the present invention provides an approach to compressing images. The illustrative embodiment encodes images in two stages. In the first stage, the margins are identified by identifying runs of commonly colored space, such as "white space", at the beginning and end of a line. The output from the first stage is then fed into a second stage that further compresses the data in the line that is not in the margins using Huffman coding.

The illustrative embodiment may be utilized by various images reproducing apparatus, including but not limited to copiers and printers. The illustrative embodiment compresses white spaces as common runs in text and color images. However, the illustrative embodiment allows the user to define other common runs beside white spaces.

Figure 1:
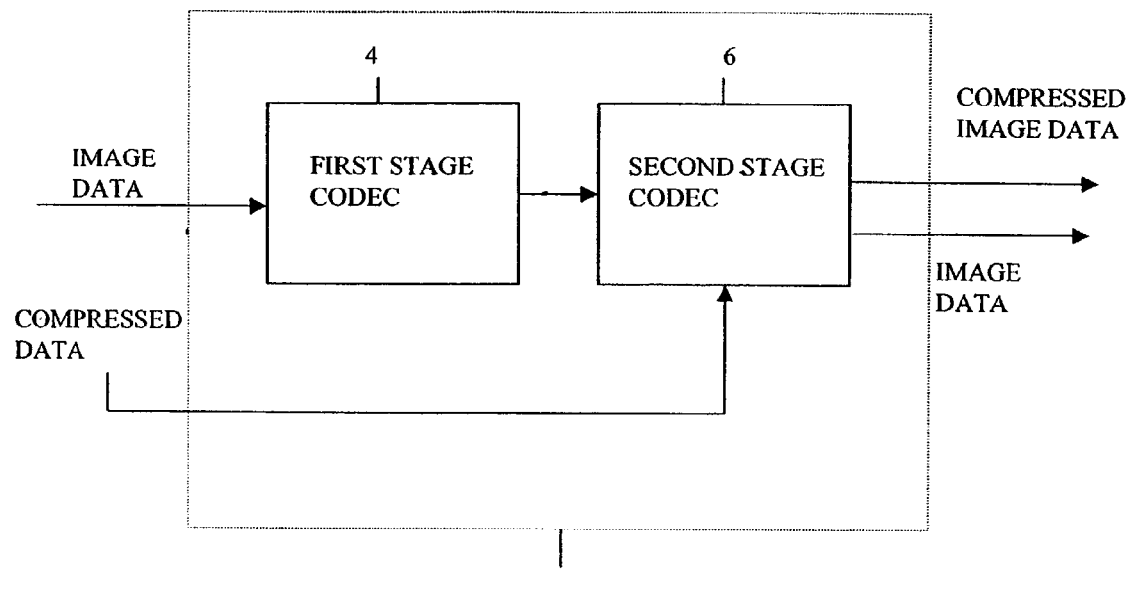
FIG. 1 illustrates a data flow in an illustrative embodiment of the present invention.

FIG. 1 illustrates a detailed description of the illustrative embodiment. The compressor/de-compressor element 2 is a two stage coder/decoder (codec) process image data a line at a time. For each line, the first stage codec 4 looks for runs of white color values for pixels. The first stage codec 4 identifies runs of white color values beginning from the left hand side of a line as constituting the left margin. In a similar fashion, runs of pixel beginning at the righthand side of the line are identified and categorized as the right margin. The first stage codec 4 identifies these runs and lumps them into the left and right margins. The first codec 4 identifies their respective lengths and ensures that no further processing is performed on these pixels when the line is further compressed by the second stage codec 6. Information regarding the analysis performed by the first stage codec 4. Information regarding the analysis performed by the first stage codec 4 is passed to the second stage codec 6 in a header 8.

The second stage codec 6 scans over the remaining data and compresses all but the header word and those words eliminated by the margins. There are two key features to this part of the illustrative embodiment: how the data is stored in the output stream, and how it is encoded. The second codec stage 4 uses a Huffman style encoding scheme to reduce the amount of data and uniquely interlaces Huffman code words with unencoded data while maintaining long word boundaries for unencoded data. To keep statistics of the output similar to the surrounding data, the Huffman code values are chosen so they may form patterns that would compress as well. The second stage codec 6 operates in two states for compressing data. The first state is used to compress large amounts of white space, and the second state is to compress small amounts of white space interspersed with non-white data. These states are referred to as "large" and "small" respectively.

Figure 2:
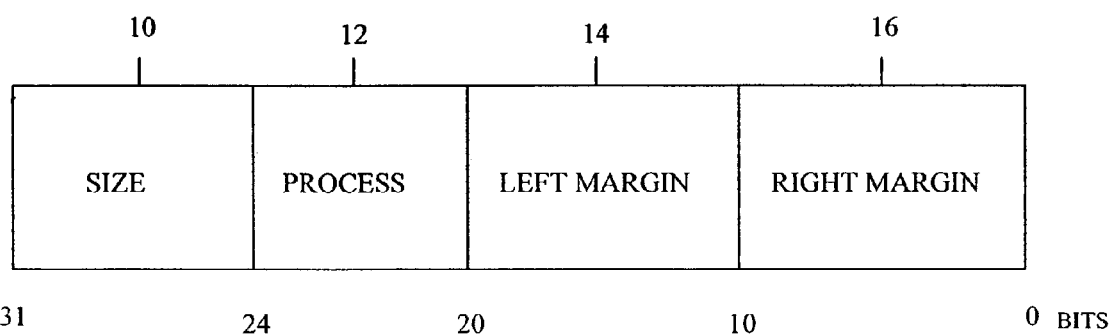
FIG. 2 illustrates a detailed depiction of the header created by the first stage codec.

FIG. 2 illustrates the header 8 created by the first codec 4 in more detail. Bits 31–24 of the header 8 are the size parameter 10, which contains a value specifying the number of unsigned long data words in the line. Bits 23–20 define the process parameter 12, which contain information regarding the compression process. The process parameter 12 may have one of four ranges of 4 bit values. In particular, a value of 0x0 for the process parameter 12 indicates that the image line is a white. A value of 0x1 describes an image line is encoded as normal. Values of 0x2-0xe are reserved and a bit value of 0xf identifies an image line that did not compress and is stored in uncompressed form. This limits the negative compression of any given line to only one long word. Left margin values 14 and right margin values 16 are stored in bits 19 to 10 and 9 to 0 respectively. Left margin values 14 and right margin values 16 have a format where the top three bits represent the offset in words from the left or right line edge, and the remaining 7 bits represent the number of white words from the offset towards the center image that are white space.

In order to appreciate operation of the illustrative embodiment, it is helpful to consider that the most common feature to any image is a white or light colored margin or line. For illustrative purposes, the illustrative embodiment may utilize a 8.5" 600 dpi image. For purposes of illustration, the illustrative embodiment utilizes a 600 dpi printer. The 600 dpi image contains approximately 5120 pixels in a line. Stored as a series of 32 bit values, there are about 160 unsigned long words. Every edge of a copied document may have a faint seam between the actual image and the background behind the scanned page. Also, margins are stored with an offset. The first unsigned long word of output from the compressor/decompressor 2 is a header word 8 containing information regarding left margins offsets, right margin offsets how the data was compressed, and amount of data being compressed.

Figure 3:
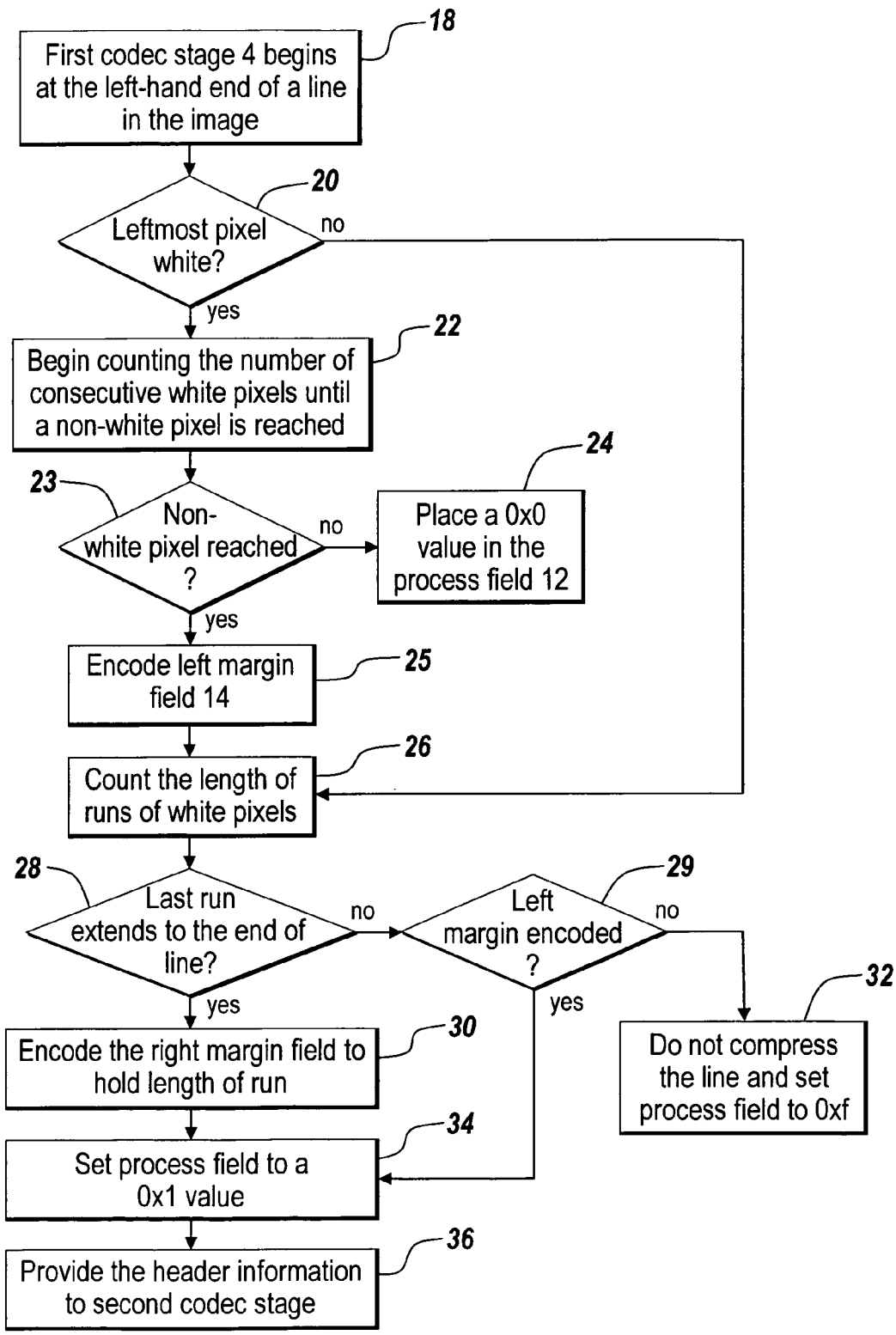
FIG. 3 depicts a flowchart illustrating steps performed by the first codec stage.

FIG. 3 depicts a flowchart illustrating in more detail steps performed by the first stage codec 4. The first stage codec 4 begins at the left-hand end of the line in the image (step 18). If the leftmost pixel is white (step 20), the first stage codec 4 begins counting the number of consecutive white pixels until a non-white pixel is reached (step 22), otherwise the first stage codec proceeds to look for a right margin (step 26). If there are no non-white pixels (step 23), the first stage codec 4 knows that the entire line is white and encodes the reader accordingly by placing a 0x0 value in the process field 12 (step 24), otherwise it notes the length of the run and encodes this information in the left margin field of 14 (step 25). As the first stage codec 4 continues to process the line, it continues to look for runs of white pixels and it counts the length of the runs (step 26). If a run extends to the end of the line (i.e. the right-hand side of the line) (step 28), the run constitutes the right margin and the right margin field 16 of the readers is encoded to hold the length of the run (step 30). If the line does not contain a right margin (step 28) and a left margin (step 29), the line is not subject to compression by the first stage codec 4, and the process field 12 is set to have a 0xf value (step 32). Where a right margin is found or a left margin is found, the process field 12 is set to have a 0x1 value (step 34). After the first stage codec 4 is completed with the creation of the header, the first stage codec provides the information to the second stage codec 6 for further processing (step 36).

Figure 4:
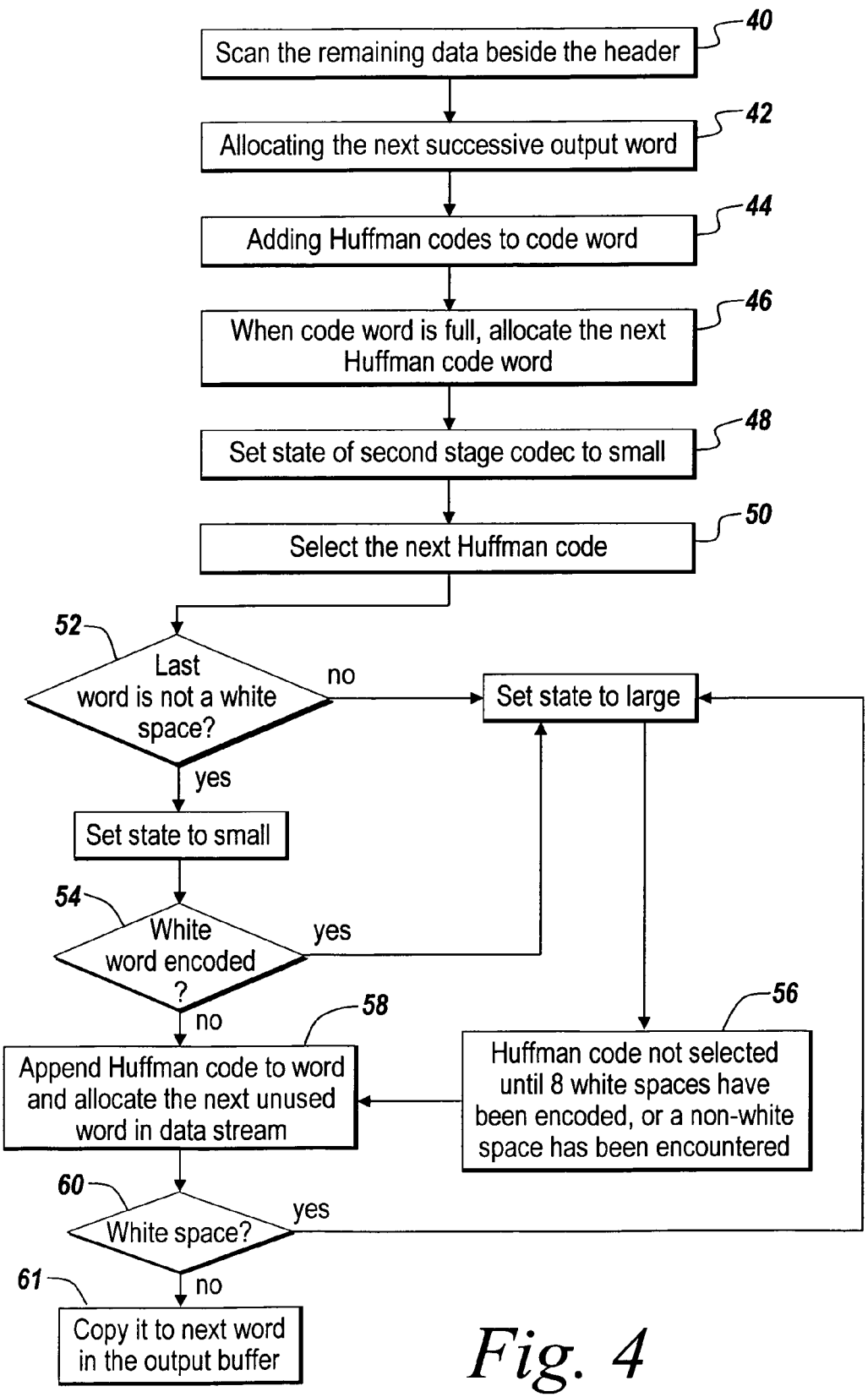
FIG. 4 depicts a flowchart illustrating the encoding steps performed by the second stage codec.

FIG. 4 depicts a flowchart illustrating the encoding steps performed by the second codec stage 6. The second stage codec 6 scans over the remaining data (i.e. the data inside of the margins) and compresses all but the header 8 and those words eliminated by the margins by employing Huffman encoding (step 40).

A Huffman code maps characters into bit sequences. These codes are used to generate compact binary representations of character strings. To create compact encodings, the Huffman coding scheme uses variable length encodings. Characters that occur frequently are coded with short bit sequences, while characters that occur infrequently are coded with long bit sequences. Thus, lowering the amount of bit sequences needed to be stored.

The second stage codec 6 encodes by allocating the next successive output word on the data stream after the header 8 to be the first Huffman code word (step 42). Starting with the high ordered bit, Huffman codes are added to the code word (step 44). When the code word is full, the next unused, unallocated output word is allocated for the next Huffman code word (step 46). When an uncompressible (non-white space) symbol is encountered, that is, when a space that contains only non-white pixels or non-white data is encountered, first the Huffman code is added (allocating the next Huffman code word if needed) and then a data word is allocated to the uncompressible symbol. With this approach, words that are not white space are copied to the output buffer interlaced with Huffman code words without significant computation. The second stage code 6 allocates the next Huffman code word and remembers its address, and set the state to small (step 48). Afterwards, the second stage codec 6 selects the next Huffman code and its size (step 50). If the last word encoded was not a white space the second stage codec 6 is in the small state (step 52). If the state of the second stage codec 6 is in the small state a white word is encoded, the second stage codec transitions to the large state (step 54). If the second stage is a large state, a Huffman code is not selected until either 8 white space words have been encoded, or a non white space word has been encountered (step 56). The second stage codec 6 appends the Huffman code to the Huffman code word, allocating the next unused word in the image data stream if all the bits in the code word are full (step 58). If the current word is not a white space (step 60), copy it to the next free word in the output buffer (step 61). The second stage codec 6 repeats the following steps as needed skipping over margins.

The second stage codec 6 also decodes a compressed image. The second stage 6 receives compressed image data from the compressor/de-compressor 2 for further processing. The second stage codec 6 proceeds to decode the compressed image data to uncompressed image data utilizing an algorithm to be discussed below.

Figure 5:
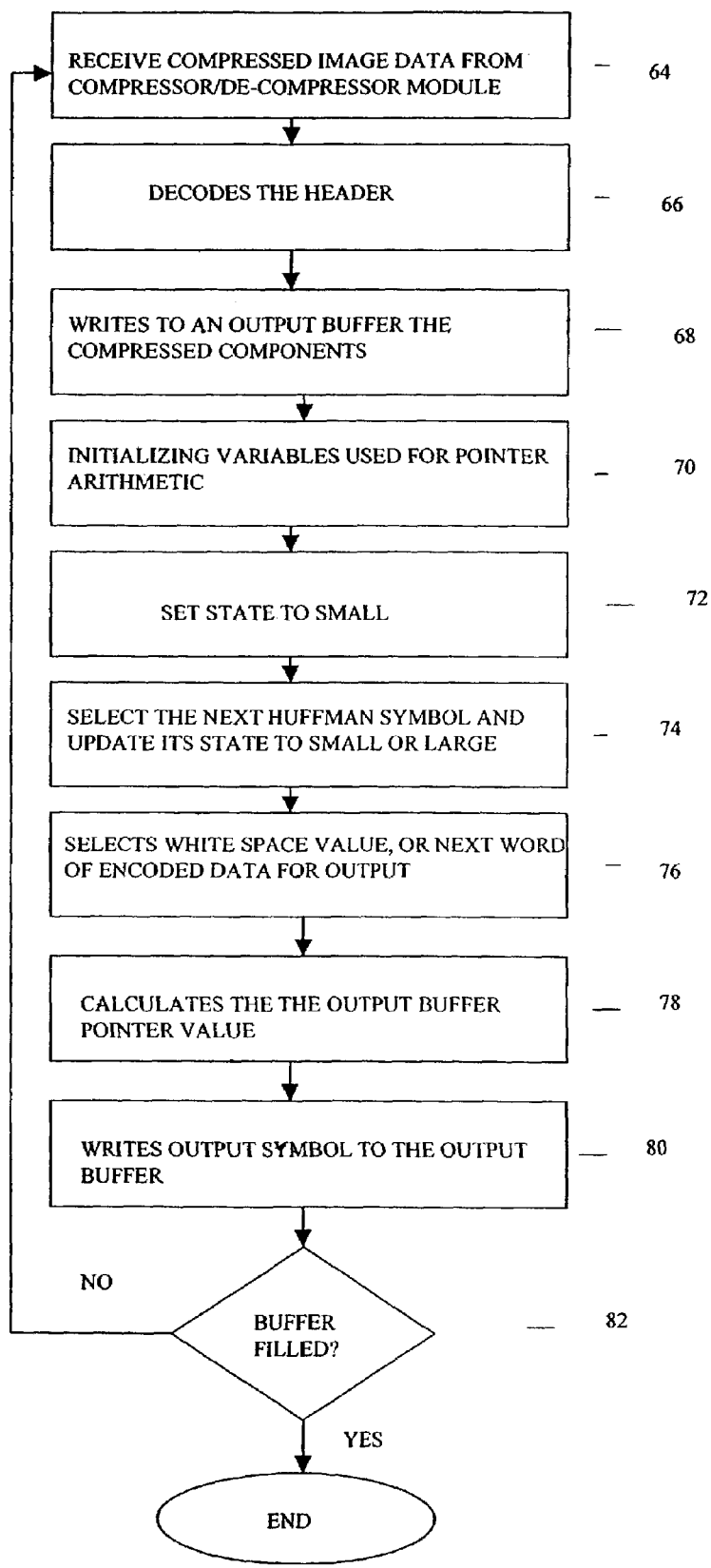
FIG. 5 depicts a flowchart illustrating the decoding steps performed by the second stage codec.

FIG. 5 depicts a flowchart illustrating the decoding steps performed by the second stage codec 6. The second stage codec 6 receives a compressed image data from the compressor/decompressor module 2 (step 64). The first unit of data that the second stage codec 6 decodes is the header 8 of the compressed image data (step 66). The second stage code 6 utilizes the information in the header 8 to properly decode the compressed image data, in particular, assigning the left and right margins of the compressed image. The second stage codec 6 writes to an output buffer the white regions of the compressed image (step 68). The output buffer stores all the uncompressed components of the compressed image. Essentially, the output buffer provides a storage location to store all uncompressed components to reproduce the image. The second stage codec initializes variables used for pointer arithmetic so that data skips over the margin regions in the image (step 70). Also, the second stage codec 6 sets itself to the small state (step 72). This is done to maintain that the second stage codec 6 does not explicitly skip over white spaces during the decompression process. The second stage codec 6 selects the next Huffman symbol and updates it state to either small or large (step 74). Updating depends on whether the selected Huffman symbol is associated with a large or small state. The second stage codec 6 selects either a white space value, or next word of encoded data for output based on the Huffman symbol (step 76). Further, the second stage codec calculates the output buffer pointer so that it skips over margin regions (step 78). Plus, the second stage codec 6 writes the output symbol to the output buffer (step 80). The second stage codec 6 may repeat step 70 if multiple white space words need to be written based on the Huffman symbol. Repeat steps 64–70 until the buffer is filled (steps 82). Essentially, this step maintains that all compressed components have compressed and added to the output buffer.

Numerous modifications and alternative embodiments of the invention will be apparent to those skilled in the art in view of the foregoing description. Accordingly, this description illustrative only and is for the purpose of teaching those skilled in the art the best mode for carrying out the invention. Details of the structure may vary substantially without departing from the spirit of the invention, and exclusive use of all modifications that come within the scope of the appended claims is reserved. It is intended that the invention be limited only to the extent required by the appended claims and the applicable rules of law.

What is claimed:

1. A compression device for compressing image data comprising:
   a first stage codec for identifying runs of pixels of a defined value in a data stream of the image data beginning from the left and right margins of a line, such that information regarding the runs is assigned as a header and appended to the data stream; and
   a second stage codec for scanning over remaining data in the data stream and compressing all but the header by utilizing a Huffman encoding scheme to reduce amount of data stored in the data stream;
   wherein the data stream contains unencoded data and the Huffman encoding scheme interleaves Huffman code values with the unencoded data while maintaining long word boundaries for the unencoded data.

2. The compression device as recited in claim 1 wherein the Huffman codes are selected so they may form patterns that compress.

3. The compression device as recited in claim 1 wherein the first stage codec identifies and categorizes the pixels of the right margin.

4. The compression device as recited in claim 3 wherein the first stage codec identifies and categorizes the pixels of the left margin.

5. The compression device as recited in claim 1 wherein the first stage codec identifies the respective length of the runs.

6. The compression device as recited in claim 1 wherein the second stage codec operates in two states, namely large and small states respectively.

7. The compression device as recited in claim 6, wherein the large state is used to compress large amounts of the defined value of pixels.

8. The compression device as recited in claim 7 wherein the small state is used to compress small amounts of the defined values interspersed with other data.

9. The compression device as recited in claim 1 wherein the header is defined by a size parameter, process parameter, left margin values, and right margin values.

10. The compression device as recited in claim 7 wherein the defined value of the pixels is white.

11. In a compression device, a method for compressing image data comprising the steps of:
    identifying runs of pixels of a defined value in a data stream beginning from the left and right margin of a line such that information regarding the runs is placed in a header and appended to the data stream; and
    scanning over remaining data in the data stream and compressing all but the header by utilizing a Huffman encoding scheme to reduce the amount of data stored in the data stream;
    wherein the data stream contains unencoded data and the Huffman encoding scheme interleaves Huffman code values with unencoded data while maintaining long word boundaries for the unencoded data.

12. The method as recited in claim 11 wherein the Huffman code values are selected so they may form patterns that compress.

13. The method as recited in claim 11 wherein the step of identifying runs of pixels further comprise the step of identifying and categorizing the pixels of the right margin.

14. The method as recited in claim 13 wherein the step of identifying runs of pixels further comprise the step of identifying and categorizing the pixels of the left margin.

15. The method as recited in claim 1 wherein the step of identifying runs of pixels further comprise the step of identifying the respective length of the runs.

16. The method as recited in claim 11 wherein the step of scanning further comprises the step of operating in two states, namely large and small states respectively.

17. The method as recited in claim 16, wherein the large state is used to compress large amounts of the defined value of pixels.

18. The method as recited in claim 17 wherein the small state is used to compress small amounts of the defined values interspersed with other data.

19. The method as recited in claim 11 wherein the header is defined by a size parameter, process parameter, left margin values, and right margin values.

20. The method as recited in claim 17 wherein the defined value of the pixels is white.

21. In a compression device, a method for compressing image data, comprises the steps of:
- identifying runs of pixels of a defined value in a data stream beginning from the left and right margin of a line;
- generating a header by assigning information collected regarding the runs of pixels to the header and appending the header as a first element in the data stream;
- allocating output words in the data stream after the header to be code words; and
- creating compressed components by encoding compressible code words with a defined set of Huffman codes, wherein the compressed components are copied to an output buffer;
- when a code word is an uncompressible symbol, a Huffman code is added and then a data word is allocated for the uncompressible symbol, wherein the uncompressible symbol is copied to the output buffer.

22. The method as recited in claim 21, further comprising the step of allocating a next code word.

23. The method as recited in claim 22, wherein the step of allocating the next code word further comprises the step of storing an address of the next code word.

24. The method as recited in claim 22, wherein the step of allocating the next code word further comprises the step of changing the state of compression.

25. The method as recited in claim 24, wherein the state of compression is either large for compressing large amounts of the runs of pixels or small for compressing small amounts of the runs of pixels.

26. The method as recited in claim 25, wherein the step of allocating the next code word further comprises the step of changing the state of compression to small, when the next code word is the uncompressible symbol.

27. The method as recited in claim 21, wherein the runs of pixels of a defined value are runs of white spaces.

28. The method as recited in claim 27, wherein the uncompressible symbol is non-white space.

29. A method for decompressing a compressed image, comprising the steps of:
- receiving a compressed data stream associated with the compressed image, wherein the compressed data stream includes encoded compressed components, uncompressed components, and a header;
- decoding the header stored in the compressed data stream;
- assigning left and right margins of the compressed image by way of information contained in the header;
- removing the uncompressed components in the compressed data stream to an output buffer;
- creating decoded components by using a defined set of Huffman codes to decode the compressed components and deliver each of the decoded components to the output buffer; and
- combining all of the uncompressed components and the decoded components in the output buffer to reproduce an actual image of the compressed image.

* * * * *